July 17, 1962 C. GRUNDY 3,044,282
UNIVERSAL JOINTS
Filed April 12, 1960

INVENTOR
Clifford Grundy
By
Watson, Cole, Grindle & Watson
ATTORNEYS

United States Patent Office 3,044,282
Patented July 17, 1962

3,044,282
UNIVERSAL JOINTS
Clifford Grundy, Chadwell Heath, England, assignor to Motor Gear & Engineering Company Limited, Chadwell Heath, England, a British company
Filed Apr. 12, 1960, Ser. No. 21,655
Claims priority, application Great Britain Apr. 20, 1959
3 Claims. (Cl. 64—17)

The invention relates to universal joints of the Hooke's type which comprise two forks pivoted by their arms about axes which intersect at right angles to the ends of what is, in effect, a cross. Such joints are employed to couple two rotatable members of which the axes intersect at the point of intersection of the aforesaid pivotal axes but may be out of alignment.

A difficulty which is found with joints of this type is that if, as is frequently the case, it is desired to reduce to a minimum the overall diameter of the joint while retaining, or providing, the strength in the arms necessary to transmit large torques, interference develops between the root portions of the arms of the two opposing forks which tends to limit the maximum angle of misalignment of the rotatable members which can be accommodated. It is an object of the invention to reduce this difficulty.

According to the invention a Hooke's joint of the above kind has the arms of each fork cut away at their inner corners or edges at least at, or in the region of, the root ends of the arms to receive, at maximum misalignment, the outer corners of the arms of the other fork. This feature enables the root portions of the arms to be constructed of maximum width, in the circumferential direction, at their maximum radius with consequential strength advantage.

Preferably the arms taper, in the circumferential direction, from their roots to a reduced circumferential width at or near their free end.

It is also preferred that the cross member at the root of each fork between the arms is cut away to the form, substantially, of a portion of a hollow cone which is co-axial with the axis of the fork and of which the sides are tangential to a sphere centered on the aforesaid intersection of the axes and having a radius at least as great as that of the free ends of the opposite fork arms from that intersection whereby the free ends of the arms of the opposite fork may enter into the cone on substantial misalignment and whereby the free length of the arms may be kept to a minimum.

In a practical form of the invention, the forks are each cut from a member of cylindrical section so that the external overall shape of the fork is cylindrical.

Figure 1:
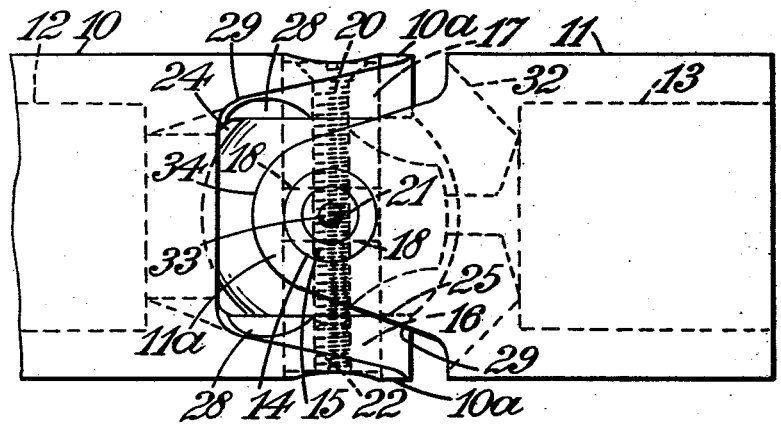
Figure 2:
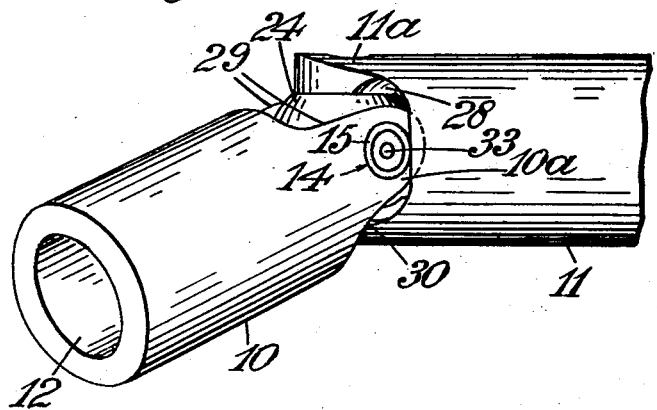

A specific example of a universal joint according to the invention will now be described, with reference to the accompanying drawings in which:

FIGURE 1 is a side view of the joint with the axes of the forks in alignment, and FIGURE 2 is a view showing the joint with the axes of the forks at or near their maximum permissible misalignment.

The universal joint comprises two forks 10, 11 adapted for joining two misaligned shafts whose axes intersect, the ends of the shafts being received in sockets 12, 13. Each fork is formed by cutting a cross-slot in the end of a cylindrical bar, the base portion of the slot having the special shape later described. The arms of fork 11 are formed with holes 14 for the reception of a spindle 15 joining the two fork arms and the other fork is similarly formed for the reception of two bushes 16, 17 of the same diameter as the spindle. The inner end of each bush is set into a circular register 18 on the spindle so that, when the bushes are assembled, as shown, on an axis intersecting the axis of the spindle at right angles, their ends fit in each side of the spindle so forming, in effect, a right angled cross with arms of equal length. The spindle and bushes are all rotatable within their respective fork arms and the assembly is held together by an axial screw 20 through the two bushes thereby intersecting the axis of the spindle at right angles, the spindle having a diametrical hole 21 formed at the centre of its length for reception of the screw. The screw 20 has a countersunk head which is received within bush 17, the stem of the screw being screwed into the bush 16. To lock the screw in place there is provided in the bush 16 a grub screw 22 which is coaxial with the screw 20 and may be screwed tightly against the end thereof to act as a locking device.

There is provided, between the arms of the forks and surrounding the spindle and bushes, a generally spherical block 24 with two intersecting holes at right angles for reception of the spindle and bushes. The block has four bearing faces 25 surrounding the ends of the said holes, which bearing faces bear against those parts of the inner faces of the fork arms which surround the spindle and bushes so providing the joint with strength and stability.

It will be seen that when forks are connected together by their respective spindle and bushes, the spindle allows rotation of its respective fork about the fork axis which is at right angles to the bushes which allow rotation of their respective fork about the axis of the bushes so providing a universal joint. In one end of the spindle is an oil hole and both spindle and bushes are provided with oil grooves for lubricating the joint.

It is obvious that for the transmission of high torques it is desirable that the fork arms 10a, 11a should be as short and, within reason, as wide in the circumferential direction, particularly at their roots, as is possible.

It is also desirable to reduce to a minimum the overall diameter of the joint while retaining its ability to transmit high torques. To produce the desired characteristics the length of the fork arms is kept small and the arms taper so that the roots of the fork arms are of increased width in the circumferential direction.

A difficulty which arises when adopting the aforesaid improvements is that the inner edges or corners of the arms of one fork will engage with similar portions of the other fork except when the shafts or members joined by the joint are aligned or misaligned by only a small degree. This engagement limits the extent to which the members may be misaligned.

Another difficulty which arises is that by keeping the forks comparatively short the free ends of the arms of one fork tend to come into engagement with the material between the roots of the other fork (i.e. with the bottom of the aforesaid cross-slot) except, again, when the shafts or members joined by the joint are aligned or misaligned by only a small degree.

To overcome the first difficulty the arms of each fork are, as shown at 28, cut away at their inner corners or edges in the region of the root ends of the arms so that the limit of misalignment is not reached until the outer corners or edges 29 of the fork arms impinge upon one another as at 30.

To overcome the second difficulty the material between the roots of each fork (i.e. the bottom of the aforesaid cross-slot) is cut away to the form, substantially, of a portion of a hollow cone 32 co-axial with the rotational axis of the fork and extending away from the fork arms. The sides of the hollow cone are tangential to a sphere centered on the intersection 33 of the pivotal axes of the forks which sphere has a raduis slightly greater than the radial distance between the outer edges 34 of the tips of the free ends of the fork arms and the said intersection 33. It will be seen that the free ends of the arms of the forks or the adjacent portions of the arms may enter into the cones on substantial misalignment whereby the free length of the arms may be kept to a minimum with a minimum reduction in the strength of the fork.

The aforesaid improvements of cutting away the inner corners of the roots of the fork arms and cutting away part of the material between the roots of the fork arms is carried out in a single operation at each side of the fork by a milling tool which is rotated about an axis at the angle of the cone aforesaid and is also swung about the axis of rotational movement of the fork. The tool is operated between the roots of the two fork arms moving from an inner corner of the root of one arm around the cone to an inner corner of the root of the other arm. The milling of both sides of the fork is carried out simultaneously. The shape of the portions cut away at the inner corners is determined by the size of the cutting tool.

I claim:

1. A universal joint of the kind comprising two forks each having two arms connected by a cross-member, said forks being pivoted to a coupling block about axes which intersect at right angles, in which the cross member of each fork has, between the arms, the form, substantially, of a portion of a hollow cone which is coaxial with the axis of the fork and of which the sides are tangential to a sphere centered on the aforesaid intersection of the axes and has a radius at least as great as that of the free ends of the opposite fork arms from that intersection.

2. A universal joint as claimed in claim 1 in which the conical form extends into the inner corners of the root ends of the arms.

3. A universal joint as claimed in claim 1 in which the forks are, externally, of over-all cylindrical form.

References Cited in the file of this patent

UNITED STATES PATENTS

| 1,143,596 | Bockhoff | June 15, 1915 |
| 2,264,727 | Stillwagon | Dec. 2, 1941 |
| 2,575,602 | Stillwagon | Nov. 20, 1951 |
| 2,903,868 | Stillwagon | Sept. 15, 1959 |